July 5, 1932.   R. J. SPINKS   1,866,375
WINDOW WIPER
Filed April 9, 1930
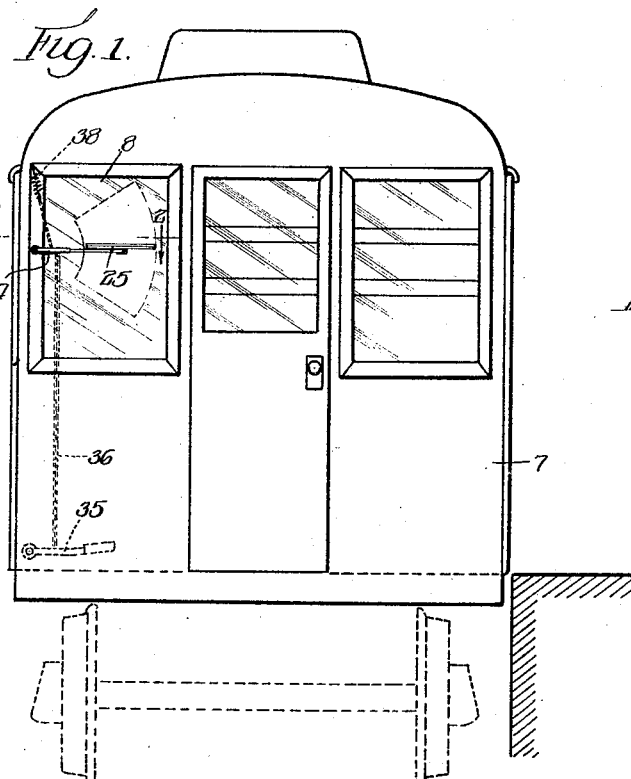

Patented July 5, 1932

1,866,375

UNITED STATES PATENT OFFICE

RALEIGH J. SPINKS, OF CHICAGO, ILLINOIS

WINDOW WIPER

Application filed April 9, 1930. Serial No. 442,779.

This invention relates to window wipers and, among the salient objects, are to provide a window wiper which may be manually or otherwise operated, and one which may be arranged to wipe both the inner and outer surfaces of the pane of the window.

The device is particularly adapted for use in connection with cars of the type that are connected together to form multiple car trains. As the device to which my invention appertains is especially adapted for the use of the operator of the train, it is manifest that a wiping arrangement need only be provided on the first car of the train. However, in the making up of such trains, it is possible that any one car may be placed in the first position and it is, therefore, necessary that a wiping arrangement be provided on each car. Further, as cars of this character are arranged to be operated from either end, it is necessary that a wiping arrangement be provided on both ends so that one will be in proper position irrespective of the manner in which the car is connected in the train. As is well understood, wiping elements suitable for use on panes of glass are made of a material which will rapidly deteriorate if exposed to weathering conditions. It is, therefore, an object of my invention to provide a wiper for the set forth purpose which will embody a minimum number of parts permanently connected in position and which will embody other parts, as, for example, those subject to deterioration which may be disconnected from the permanent parts in order that the life of these elements may be prolonged.

It will sometimes be necessary that these devices be installed in positions where passengers of the cars might come in contact with them and it is, therefore, a further object of the invention to reduce the protuberances to the smallest possible size and to thereby reduce the likelihood of passengers catching their clothes thereon.

A still further object of the invention is to arrange the device in a manner such that the removable parts may be expeditiously and positively installed in position.

A selected embodiment of the invention is illustrated in the accompanying drawing and, therein:

Fig. 1 is a front elevational view of one type of car with which my invention is adapted to be associated and on which a selected embodiment of my invention has been installed;

Fig. 2 is a horizontal sectional view of a window construction with which my invention has been associated;

Fig. 3 is a perspective view of one of the removable parts of my construction;

Fig. 4 is a view similar to Fig. 2 illustrating a modified form of construction;

Fig. 5 is a fragmental elevational view of a portion of the device illustrated in Fig. 4; and Fig. 6 is a sectional detail view of the mounting of a portion of the device illustrated in Figs. 4 and 5.

In the accompanying drawing, 7 indicates a typical car of the character with which my invention is adapted to be associated, and it is to be understood that my invention might be associated with a car of suitable construction, as, for example, one, of the character used on elevated transit lines and the like. Cars of this character have an operator's cab at each end thereof including a window 8, having a frame 9 and a pane of glass 10. My improved wiper structure is mounted in an opening 11 in the outwardly disposed of the vertical rails of the frame 9. In the embodiment of the invention illustrated in Fig. 2, a bushing 12, including a flange 13, is extended through the opening 11. The permanently connected portions of my wiper structure include the fingers 14 and 15, the finger 14 being mounted on the outer side of the window structure while the finger 15 is mounted on the inner side thereof. The finger 14 includes a post section 16 embodying a reduced portion 17 defining a shoulder 18. The reduced portion 17 is extended through the bore of the bushing 12 with the shoulder 18 abutting the face of the flange 13. The outer end of the reduced portion 17 is screw-threaded, as indicated at 19, and in the base portion 20 of the finger 15 is a screw-threaded opening which is mounted on this screw-threaded end portion 19, a washer 21 being disposed between the base portion 20 and the adjacent face of the rail of the frame 9. By screwing the base portion 20 onto the end portion 19 the post 16 may be firmly held against endwise movement in the bushing while being rotatable therein. A washer 22 and a lock nut 23 are provided to prevent displacement of the base portion 20. It is, therefore, apparent that the fingers 14 and 15 are pivotally mounted in position in the frame 9 and this arrangement provides the permanently connected portion of my device. These permanently connected portions embody a minimum number of parts and, by reason of their construction, protruding portions are substantially eliminated and thus the likelihood of clothing being caught thereon is greatly reduced. A construction such as the foregoing will be associated with the window of each cab of every car. Therefore, when any one of the cars is arranged in first position in a train the operator need only connect the other portions of my improved device to the above described portions to provide a complete wiper structure. These other or removable portions include the following devices: on elongated clamp member 24 is provided having wiping elements 25 of sheets of rubber or the like therein. Secured at the medial portion of the clamping member 24 is a substantially U-shaped connecting member 26 having the bight portion 27 thereof reduced in width and spaced from the member 24. A suitable device, such as the cotter pin 28, is extended between the limbs of the clamping member 26 below the bight portion 27. A rod 29 is provided which has a hook 30 at one end thereof and a right angularly extending portion 31 at the other end. The hook portion 30 is intended to be disposed in the clamping member 26 with the pin 28 in the loop thereof whereby the bight portion 27 will prevent displacement of the hook 30 from the pin. Inasmuch as it is desirable to wipe both the inner and outer surfaces of the pane 10, I provide two arrangements of the above described character and while these arrangements may be of identical construction, I prefer that the one to be used on the inner surface have felt or the like arranged thereon in place of the rubber plies 25. When these devices are not disposed in operating position the hook 30 may be disconnected from the pin 28 and the device may be arranged substantially in the manner illustrated in Fig. 3 wherein it is apparent that the rod 29 and the clamping member 24 are arranged to be substantially coextensive. This greatly facilitates transportation of these detachable portions. In order to connect the detachable wiping elements to the finger 14 the device is arranged in the following manner: at the free end of the finger 14 is a portion 32 which extends toward the pane 10. The end of the portion 32 is bifurcated at 33. In the finger 14 is an opening 34. The rod 29 is preferably formed from resilient material which has an arched portion therein. Therefore, when the end portion 31 is extended through the opening 34 and a portion of the rod 29 is arranged in the bifurcation 33 and when the hook 30 is connected to the pin 28, in the manner illustrated in Fig. 2 the wiper elements will be forced against the pane 10. The finger 15 is substantially U-shaped and one limb carries the base 20 while the other limb is extended toward the pane of glass and the end of this last named limb is bifurcated. An opening similar to the opening 34 is provided in the finger 15 and, therefore, a wiper structure may be detachably connected to the finger 15 in the same manner as that in which such a structure is connected to the finger 14. It should be noted that either or both of the wiper elements may be used as the tension with which one of these elements is held against the pane does not depend upon the other element. As best illustrated in Fig. 1, the wiper structure is mounted at substantially the mid-position in the rail and, therefore, when the device is oscillated the wiper elements will clear a space such as that shown in Fig. 1. If desired, the finger 15 may be made of greater length than the finger 14 and, as this finger is disposed in the cab, it is apparent that this finger may be gripped by the operator and used to bring about oscillation of the structure. However, it will frequently be desirable that the operator have both hands free and I have, therefore, provided an arrangement whereby the operator may oscillate the wiper structure with his foot. This arrangement includes a suitable pedal 35 mounted in the cab of the car. A chain or other suitable connecting member 36 has one end thereof connected to the pedal 35. The chain 36 is also attached to the connecting member 37 on the under side of the finger 15, Fig. 2. The upper end of the chain is connected to a spring 38 mounted in the cab and a connecting member 39 interconnects the spring 38 and the upper side of the finger 15. This arrangement is such that when the pedal 35 is moved downwardly the wiper elements are moved and the spring 38 is expanded. Therefore, when pressure is removed from the pedal 35 the spring 38 moves the parts upwardly.

In Figs. 4, 5 and 6, I have illustrated a modified form of construction for the permanently attached portions. In this instance the finger 40, similar to the finger 15, includes a post 41 embodying a reduced portion 42 threaded at 43. The post 41 is extended through the bushing 12 in the opening 11 in the rail 9 and the shoulder, defined by the reduced portion 42, abuts a washer 44. A nut 45 on the screw-threaded portion 43 abuts the flange 13 to retain the device in position. The wiper element is connected to the finger 40 in the manner heretofore set forth. However, at the outer end of the reduced section 42 a reduced flattened portion 46 is provided which has a notch 47 in one edge thereof. In place of the right angularly extending portion 31 an angle portion 48 is provided which is extended through an opening in the plate 49 and a suitable connecting member 50 interconnects the rod 29 and the plate 49, Fig. 4. One end portion of the plate 49 is bifurcated at 51 and a bridge 52 extends across this bifurcation. In order to connect the wiper element, the flattened section 46 is arranged in the bifurcation 51 and the bridge 52 is disposed in the notch 47 against the lug 53. By reason of the innate resiliency of the rod 29, displacement of the portions will be prevented. This device will be operated in the same manner as the one previously described. The advantage of this latter structure is that the finger 14 is omitted and only the section of the reduced portion 42 extending beyond the nut 45 need be provided and this portion may be made of greater or less extent than that shown in accordance with the requirements of the device.

While I have illustrated and described the preferred form of construction for carrying my invention into effect, it is to be understood that changes and modifications may be made therein without departing from the purview of the invention set forth in the following claims:

I claim:

1. A wiper including a finger structure comprising a post portion, means pivotally and permanently mounting the post portion in the frame of a window, wiping means, a resilient rod having one end thereof detachably connected to the finger of the finger structure and having the other end thereof connected to the medial portion of the wiping means, said finger including a portion engaging said rod intermediate the connection of said rod to said finger structure and the connection of said rod to said wiping means whereby said finger will act on said rod to firmly hold the wiping means in wiping position.

2. A device for wiping the pane of a window including a rotatable post mounted in the frame of said window, said post including a finger extending over said pane in spaced relation therewith, a wiping element, a rod slidably connected to said wiping element, means securing said wiping element to one end of said rod to hold said wiping element against sliding movement therealong, said finger having an opening therein spaced from the free end thereof, and means on the end of said rod opposite the end connected to said wiping means and adapted to be extended through said opening in said finger to detachably connect said rod to said finger, the free end of said finger engaging said rod intermediate the connection of said rod to said finger structure and the connection of said rod to urge said wiping means into engagement with said pane.

3. A device for wiping the pane of a window including a rotatable post mounted in the frame of said window, said post including a finger extending over said pane in spaced relation therewith, a wiping element, an attaching device mounted on said wiping element medially thereof, a rod slidably mounted in said attaching device, means fixing one end of said rod in said attaching device, said finger having an opening therein spaced from the free end thereof and having a bifurcation in the free end thereof, means on the free end of said rod adapted to be detachably mounted in the opening in said finger whereby a portion of the rod intermediate the ends thereof may be arranged in said bifurcation whereby said finger will act on said rod to urge said wiping element into engagement with said pane.

4. A device for wiping the pane of a window including a rotatable post mounted in the frame of said window, said post including a finger extending over said pane in spaced relation therewith and having the free end thereof extended toward said pane and having a bifurcation in said free end, a wiping element, a rod, means connecting one end of said rod to said wiping element, and means for connecting the other end of said rod to said finger with an intermediate portion of said rod in the bifurcated end portion of said finger whereby said rod will be tensioned to urge said wiping element into engagement with said pane.

5. A wiping element for a wiper structure comprising an angular elongated clamp member having wiping members secured therein, a substantially U-shaped attaching device mounted at the medial portion of said clamp member, a member extending across said attaching device below and spaced from the bight thereof, and an attaching rod extending through said attaching device below the bight portion thereof and having a hook on one end thereof engageable with said member extended across said attaching device and having an attaching portion on the other portion thereof, all whereby said hook portion may be disengaged from said member and said rod may be arranged to be coextensive with said clamping member, said hook and said attaching portion preventing undesired displacement of said rod from said attaching device.

6. A device for wiping the pane of a window including a rotatable post mounted in the frame of said window, said post including a finger extending over said pane in spaced relation therewith, a wiping element, an attaching device mounted on said wiping element medially thereof, means for fixing one end of said rod in said attaching device, said finger having an opening therein spaced from the free end thereof and having a bifurcation in the free end thereof, means on the free end of said rod adapted to be detachably mounted in the opening in said finger whereby a portion of the rod intermediate the ends thereof may be arranged in said bifurcation whereby said finger will act on said rod to urge said wiping element into engagement with said pane, and means connected to said rotatable post for operating said finger whereby said wiping means may be moved over said pane.

RALEIGH J. SPINKS.